US006726851B1

United States Patent
Thomsen

(12) United States Patent
(10) Patent No.: US 6,726,851 B1
(45) Date of Patent: Apr. 27, 2004

(54) PROCESS FOR CARRYING OUT NON-ADIABATIC CATALYTIC REACTIONS

(75) Inventor: Søren Gyde Thomsen, Lyngby (DK)

(73) Assignee: Haldor Topsoe A/S, Lyhgby (DK)

( * ) Notice: Subject to any disclaimer, the term of this patent is extended or adjusted under 35 U.S.C. 154(b) by 546 days.

(21) Appl. No.: 09/722,482

(22) Filed: Nov. 28, 2000

Related U.S. Application Data

(60) Provisional application No. 60/168,390, filed on Dec. 2, 1999.

(51) Int. Cl.$^7$ .............................. C01B 3/26; C01B 3/18
(52) U.S. Cl. ................. 252/373; 423/418.2; 423/648.1; 423/652; 423/659
(58) Field of Search .................. 423/652, 653, 423/654, 418.2, 659; 252/373

(56) References Cited

U.S. PATENT DOCUMENTS

| | | | |
|---|---|---|---|
| 3,868,428 A | * | 2/1975 | Cox |
| 3,958,951 A | | 5/1976 | Woebcke et al. |
| 4,079,017 A | | 3/1978 | Crawford et al. |
| 4,101,376 A | * | 7/1978 | Cornelius et al. ........... 252/373 |
| 4,594,227 A | * | 6/1986 | Ohsaki et al. ............... 422/148 |
| 4,822,521 A | * | 4/1989 | Fuderer ....................... 252/373 |
| 5,039,510 A | * | 8/1991 | Pinto ........................... 252/373 |
| 5,925,328 A | * | 7/1999 | Stahl et al. .................. 252/373 |
| 5,932,141 A | * | 8/1999 | Rostrop-Nielsen et al. . 252/373 |
| 6,077,459 A | * | 6/2000 | Laursen et al. ............. 423/652 |
| 6,123,873 A | * | 9/2000 | Primdahl .................... 252/373 |
| 6,224,789 B1 | * | 5/2001 | Dybkjaer .................... 252/373 |

FOREIGN PATENT DOCUMENTS

| | | |
|---|---|---|
| EP | 0 271 299 | 6/1988 |
| EP | 0 326 662 | 8/1989 |
| EP | 0 334 540 | 9/1989 |
| EP | 0 440 258 A2 | 8/1991 |
| JP | 59083904 | 5/1984 |

* cited by examiner

Primary Examiner—Wayne A. Langel
(74) Attorney, Agent, or Firm—Dickstein Shapiro Morin & Oshinsky, LLP

(57) ABSTRACT

Process for carrying out non-adiabatic reactions comprising the steps of:
  introducing in parallel a first stream of reactants into a first reaction space and a second stream of reactants into a second reaction space;
  at reaction conditions contacting the first reactant stream with a catalyst in the first reaction space in indirect heat exchange with a heat exchanging medium and contacting the second reactant stream with a catalyst in the second reaction space in indirect heat exchange with a heat exchanging medium, and withdrawing a first and second steam reformed product gas; and
  the catalyst in the first reaction space being arranged within a tubular reactor in indirect heat exchanging relationship with the heat exchanging medium by introducing the medium into tubular heat exchange space concentrically surrounding the tubular reactor with the first reaction space, the catalyst in the second reaction space being arranged on shell side of a heat exchange space in indirect heat exchanging relationship with the heat exchanging medium.

3 Claims, 1 Drawing Sheet

PROCESS FOR CARRYING OUT NON-ADIABATIC CATALYTIC REACTIONS

This application claims the benefit of U.S. Provisional Application No. 60/168,390, filed Dec. 2, 1999.

FIELD OF THE INVENTION

The present invention relates to a process and reactor system for carrying out non-adiabatic reactions proceeding in a process gas in presence of a catalyst exothermically or endothermically in indirect heat exchange with an appropriate heat exchange medium.

SUMMARY OF THE INVENTION

A general object of this invention is thus to provide a process for carrying out non-adiabatic reactions comprising the steps of:

introducing in parallel a first stream of reactants into a first reaction space and a second stream of reactants into a second reaction space, at reaction conditions contacting the first reactant stream with a catalyst in the first reaction space in indirect heat exchange with a heat exchanging medium and contacting the second reactant stream with a catalyst in the second reaction space in indirect heat exchange with the heat exchanging medium, the catalyst in the first reaction space being arranged within a tubular reactor in indirect heat exchanging relationship with the heat exchanging medium by introducing the medium into tubular heat exchange space concentrically surrounding the tubular reactor with the first reaction space, the catalyst in the second reaction space being arranged on shell side of a heat exchange space in indirect heat exchanging relationship with the heat exchanging medium.

The invention is in particular useful in carrying out steam reforming reactions in a hydrocarbon feed stock by heat supplied from hot effluent gas from an autothermal steam reforming reactor and steam reformed product gas from the process.

BRIEF DESCRIPTION OF THE DRAWINGS

Specific embodiments of the reaction system according to the invention are described more detailed in the following description by reference to the drawings in which.

DETAILED DESCRIPTION OF THE PREFERRED EMBODIMENT

Steam reforming is an endothermic chemical reaction, where hydrocarbons and steam react on a steam reforming catalyst, and if appropriate heat is supplied to the location of the reaction.

Figure 1:
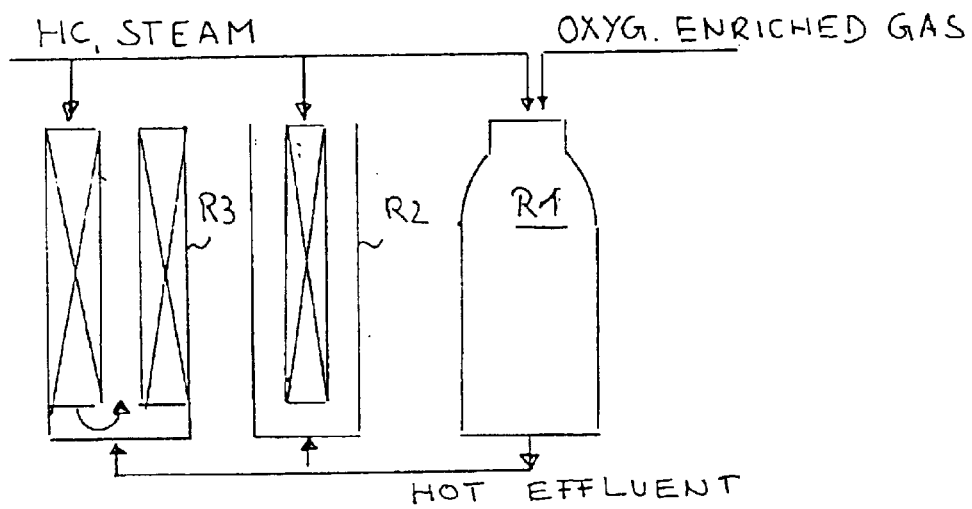
FIGS. 1 and 2 show schematically a reaction systems being used in the production of a gas with a high content of hydrogen and/or carbon monoxide from steam-reforming of a hydrocarbon feed stock.

The reactor system being used in the embodiment of FIG. 1 consists of three reactors, wherein the steam reforming process is carried through. The three reactors R1, R2 and R3 are operated in parallel.

R1 is an adiabatic reactor. The reactants for the process in R1 consist of hydrocarbon, steam and an oxygen rich gas being introduced into the reactor at an appropriate temperature and mixed. The oxygen and the hydrocarbon will react by combustion and result in a hot gas of residual hydrocarbon, steam and resulting in products from the combustion. Subsequently, the hot gas is passed through a bed of reforming catalyst and catalytically converted to a hot mixture of hydrogen, carbon monoxide and carbon dioxide. R2 and R3 are two plug flow reactors. The reactants for the process in R2 and R3 are a mixture of hydrocarbon and steam, which is heated to an appropriate temperature before flowing through a bed of reforming catalyst. Walls surround and enclose the catalyst beds of R2 and R3. A hot gas is flowing outside these walls countercurrent to the reacting gases in the catalyst beds. Heat is conducted through the walls from the hot gas to the reacting gases, while the gases are converted to a hot mixture of hydrogen, carbon monoxide and carbon dioxide.

The product gases from R1, R2 and R3 are mixed and form the hot gas flowing outside the walls of R2 and R3, where they form the heat source of the reactions in R2 and R3. This gas is called the heating gas.

As a general advantage of the invention, the walls of R2 and R3 can be arranged in a layout so as to form an optimal channel for the heating gas.

The invention provides, furthermore, a reaction system being in particular useful for carrying out the above process. In general, the reaction system of this invention comprises connected in parallel a first and a second reaction compartment being adapted to hold a catalyst and to receive a reactant stream, the first compartment being in form of a reactor tube, wherein a first heat exchange space concentric and spaced apart surrounds the first reaction compartment, and the second reaction compartment surrounds a second heat exchange space.

Reactor R2 contains the catalyst inside tubes. Reactor R3 holds the catalyst outside the tubes. The combined reactor R2 and R3 comprises a number of double-tubes, where the inner tubes are catalyst filled (R2) and the double-tubes are in addition arranged in a pattern allowing the volume between the double-tubes to be filled with catalyst as well, i.e. reactor R3. The sensible heat from the combined product gas from the reactors R1, R2 and R3 is cycled back to the reactors R2 and R3. The product gas is flowing in annular channels provided by the double-tubes, counter-currently to the flow in the reactors R2 and R3. Heat is supplied to reactor R2 via the inner wall of the double pipes and the reactor R3 is supplied with heat from the outer wall of the double-tubes.

Figure 2:
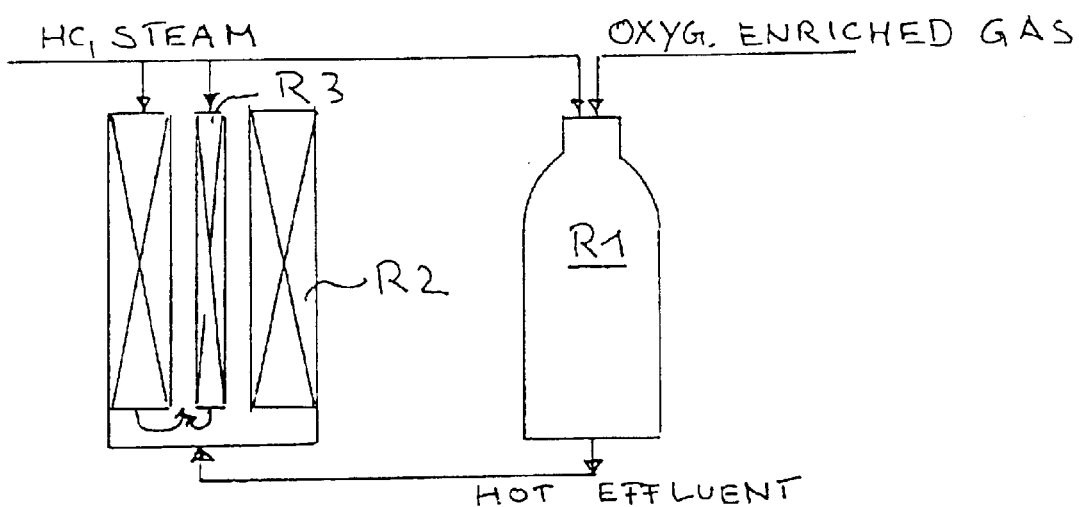

The advantage of the combined reactor as shown in FIG. 2 is that the heat exchange channels are utilised in an optimal manner, i.e. both the inner wall and the outer wall are utilised as exchange heat surfaces thus making optimal use of expensive material. This also leads to a very compact design of equipment compared to other types of heat exchange reformers and at the same time provides low pressure drop.

On cooling the product gas, a certain risk of metal dusting corrosion exists. A further advantage of the combined reactor design is restricted risk of metal dusting to a limited surface.

The double tube dimensions are typically: Inner tube OD 50 to 140 mm and outer tube OD 80 to 170 mm. The layout can be but need not be arranged in such a way that the heat exchange/area/catalyst volume ratio is equal for the inner tube and the outer tubes.

What is claimed is:

1. Process for carrying out non-adiabatic reactions comprising the steps of:

introducing in parallel a first stream of steam reform reactants into a first reaction space and a second stream of steam reform reactants into a second reaction space;

at reaction conditions contacting the first reactant stream with a catalyst in the first reaction space in indirect heat exchange with a heat exchanging medium and contacting the second reactant stream with a catalyst in the second reaction space in indirect heat exchange with a heat exchanging medium; and withdrawing a first steam reformed product gas and a second steam reformed product gas, respectively, from the first and second reaction spaces, the catalyst in the first reaction space being arranged within a tubular reactor in indirect heat exchanging relationship with the heat exchanging medium by introducing the medium into tubular heat exchange space concentrically surrounding the tubular reactor with the first reaction space, the catalyst in the second reaction space being arranged on shell side of a heat exchange space in indirect heat exchanging relationship with the heat exchanging medium.

2. Process of claim 1, wherein the non-adiabatic reaction is endothermic steam reforming of a hydrocarbon feedstock.

3. Process of claim 1, wherein the heat-exchanging medium comprises an effluent stream from autothermal steam reforming of a hydrocarbon feed stock and/or the first and second steam reformed product gasses.

* * * * *